United States Patent
Ha (10) Patent No.: US 10,437,133 B2
(45) Date of Patent: Oct. 8, 2019

(54) CAMERA MODULE AND OPTICAL INSTRUMENT

(71) Applicant: LG INNOTEK CO., LTD., Seoul (KR)

(72) Inventor: Tae Min Ha, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/031,597

(22) Filed: Jul. 10, 2018

(65) Prior Publication Data

US 2018/0321572 A1 Nov. 8, 2018

Related U.S. Application Data (63) Continuation of application No. 15/304,789, filed as application No. PCT/KR2015/003671 on Apr. 14, 2015, now Pat. No. 10,054,840.

(30) Foreign Application Priority Data

Apr. 17, 2014 (KR) .................. 10-2014-0045996

(51) Int. Cl.
  *G03B 13/36* (2006.01)
  *G03B 17/02* (2006.01)
  (Continued)

(52) U.S. Cl.
  CPC .............. *G03B 13/36* (2013.01); *G02F 1/29* (2013.01); *G03B 3/10* (2013.01); *G03B 17/02* (2013.01);
  (Continued)

(58) Field of Classification Search
  CPC .......... G03B 13/36; G03B 17/02; G03B 3/10; G03B 2205/0007; G03B 2205/0053;
  (Continued)

(56) References Cited

U.S. PATENT DOCUMENTS

| 8,164,842 B2 | 4/2012 | Shiraki et al. |
| 9,565,346 B2 | 2/2017 | Ikemoto |

(Continued)

FOREIGN PATENT DOCUMENTS

| CN | 2840086 Y | 11/2006 |
| CN | 101900896 A | 12/2010 |

(Continued)

OTHER PUBLICATIONS

International Search Report in International Application No. PCT/KR2015/003671, filed Apr. 14, 2015.
(Continued)

*Primary Examiner* — Nhan T Tran
(74) *Attorney, Agent, or Firm* — Saliwanchik, Lloyd & Eisenschenk (57) ABSTRACT

The present invention relates to a camera module comprising: a printed circuit board having an image sensor mounted thereon; a holder member provided on the printed circuit board and having a lens barrel provided therein; an optical module arranged on the upper side of the holder member and performing an auto-focusing function and/or an image stabilization function; and an electric current applying unit for electrically connecting the printed circuit board and the optical module, wherein the electric current applying unit comprises: first and second conductive members connected to the printed circuit board; and first and second plate members which are arranged on the upper side of the holder member and are electrically connected to each of the first and second conductive members, and which are electrically connected through the optical module. Through the present invention, a separate circuit board for applying a power source to an optical module is not required, and thus, it is possible to lower the height of the camera module as much as the thickness of a circuit board.

13 Claims, 12 Drawing Sheets

(51) Int. Cl.
*H04N 5/225* (2006.01)
*H04N 5/232* (2006.01)
*G03B 3/10* (2006.01)
*G02F 1/29* (2006.01)

(52) U.S. Cl.
CPC ......... *H04N 5/2252* (2013.01); *H04N 5/2253* (2013.01); *H04N 5/2254* (2013.01); *H04N 5/2257* (2013.01); *H04N 5/23264* (2013.01); *G03B 2205/0007* (2013.01); *G03B 2205/0053* (2013.01)

(58) Field of Classification Search
CPC .............. H04N 5/2254; H04N 5/2252; H04N 5/23264; H04N 5/2253; H04N 5/2257; G02F 1/29
See application file for complete search history.

(56) References Cited

U.S. PATENT DOCUMENTS

| | | | |
|---|---|---|---|
| 2002/0154239 A1 | 10/2002 | Fujimoto et al. | |
| 2010/0247086 A1* | 9/2010 | Tallaron | G02B 3/14 396/133 |
| 2011/0134303 A1* | 6/2011 | Jung | H01L 27/14618 348/340 |
| 2011/0304762 A1* | 12/2011 | Chiu | G02F 1/29 348/335 |
| 2012/0120298 A1* | 5/2012 | Chiu | G02B 3/14 348/335 |
| 2012/0140101 A1* | 6/2012 | Afshari | H04N 5/2257 348/308 |
| 2012/0314307 A1 | 12/2012 | Ikushima et al. | |
| 2013/0003010 A1* | 1/2013 | Yu | G03B 3/04 349/200 |
| 2013/0057757 A1* | 3/2013 | Ryou | G02B 7/08 348/374 |

FOREIGN PATENT DOCUMENTS

| | | | | |
|---|---|---|---|---|
| CN | 103238109 A | 8/2013 | | |
| JP | 2011090078 | 5/2011 | | |
| JP | 2011-164632 A | 8/2011 | | |
| KR | 100733239 B1 | 6/2007 | | |
| KR | 20100062569 A | 6/2010 | | |
| KR | 20130059046 A | 6/2013 | | |
| KR | 20130091379 A | 8/2013 | | |
| WO | WO-2013/133584 A1 | 9/2013 | | |
| WO | WO-2013133584 A1 * | 9/2013 | | G03B 3/10 |
| WO | WO-2013/190918 A1 | 12/2013 | | |

OTHER PUBLICATIONS

Supplementary Partial European Search Report dated Oct. 13, 2017 in European Application No. 15780657.1.
Supplementary European Search Report dated Jan. 31, 2018 in European Application No. 15780657.1.
Office Action dated Jun. 29, 2018 in Chinese Application No. 201580020146.5.

* cited by examiner

CAMERA MODULE AND OPTICAL INSTRUMENT

CROSS-REFERENCE TO RELATED APPLICATIONS

This application is a continuation of U.S. application Ser. No. 15/304,789, filed Oct. 17, 2016, which is a U.S. national stage application of International Patent Application No. PCT/KR2015/003671, filed Apr. 14, 2015, which claims priority to Korean Application No. 10-2014-0045996, filed Apr. 17, 2014, the disclosures of each of which are incorporated herein by reference in their entirety.

TECHNICAL FIELD

Exemplary embodiments of the present disclosure relate to a camera module and an optical apparatus.

BACKGROUND

Conventional technology such as VCM (Voice Coil Motor) used in general camera modules is difficult to be applied to subminiature and low power consuming camera modules. Thus, related researches have been actively conducted.

Recently, a camera module capable of performing auto focusing operation using an actuator has been developed, so that the value of subminiature, low power consuming and highly efficient camera module are being demonstrated. In order to drive an actuator, an AF (Auto Focus) terminal and a PCB AF (Auto Focus) pad at both electrodes are required to be electrically connected to control the actuator.

In particular, a complex process to connect the electrodes as described in the above is required, when a micro actuator is used for miniaturization of the camera module.

SUMMARY

One purpose of the present disclosure is to provide a camera module having advanced structure so as to include at least one of auto focus function and handshake prevention function.

Another purpose of the present disclosure is to provide an optical apparatus including the camera module.

In a general aspect, there is provided a camera module, comprising: a PCB (Printed Circuit Board) mounted with an image sensor; a holder member installed at the PCB, and installed with a lens barrel inside of the holder member; and an optical module arranged at an upper side of the holder member, and performing at least one of auto focusing function and optical image stabilization function; and a conductive unit electrically connecting the PCB and the optical module, wherein the conductive unit may comprise: a first conductive member and a second conductive member connected to the PCB; and a first plate member and a second plate member, arranged at an upper side of the holder member, respectively connected to each of the first and second conductive members, and electrically connected through the optical module.

In some exemplary embodiments, the camera module may further comprise a cover member installed at an upper surface of the holder member, wherein the optical module may be disposed in an internal space of the cover member.

In some exemplary embodiments, the cover member may comprise a concave groove, in a shape corresponding to that of the optical module, formed on a bottom surface facing the holder member.

In some exemplary embodiments, at an edge part of the concave groove, a circular-shaped gap groove may be formed on a portion corresponding to an edge part of the optical module.

In some exemplary embodiments, the camera module further comprise: a pair of rib parts connecting the first and the second plate member with each other, wherein the rib part is exposed to an outside of the holder member and the cover member, and is cut after completion of assembly process.

In some exemplary embodiments, the cover member may comprise a rib groove part formed on a position corresponding to that of the rib part.

In some exemplary embodiments, the holder member may further comprise a conductive member supporting part supporting the conductive member.

In some exemplary embodiments, the conductive member supporting part may comprise: a corner part formed on a body of the holder member, and having a conductive member hole; and a conductive member groove recessedly formed on an outer circumferential surface of the body of the holder member, wherein at least a portion of the conductive member groove may have a shape corresponding to that of the conductive member.

In some exemplary embodiments, the conductive member holes may be provided in a number of two, and wherein the two conductive member holes may be arranged at two corners arranged in a diagonal direction based on a center of the holder member, among four corners of the body of the holder member.

In some exemplary embodiments, a filter installation part, at which an infrared cut-off filter is to be installed, may be formed on a bottom surface of the holder member.

In some exemplary embodiments, the infrared cut-off filter may have a tetragonal shaped cross section, and the filter installation part may comprise circular gap grooves formed on four edge parts.

In some exemplary embodiments, the optical module may comprise, on a bottom surface, a plurality of pad parts respectively connected to the first and the second plate members.

In some exemplary embodiments, the plurality of pad parts is arranged at positions corresponding to at least two of the four edge parts of the optical module.

In some exemplary embodiments, a thickness of the first and the second plate members is no more than 0.03 mm.

In another general aspect, there is provided a camera module, comprising: a PCB (Printed Circuit Board); a holder member having one side supported by the PCB; a cover member disposed at another side of the holder member; an optical module disposed between the holder member and the cover member, and performing at least one of auto focusing function and optical image stabilization function; a first plate member and a second plate member disposed between the holder member and the cover member, and electrically connected to the optical module; and a first conductive member and a second conductive member respectively connecting the first plate member and the second plate member to the PCB.

In some exemplary embodiments, a refractive index of the optical module may be changed depending on supplied electric power.

In some exemplary embodiments, the first plate member may comprise: a terminal part connected to the conductive member; a connection terminal part connected to the optical module; and a through hole in which a coupling protrusion of the cover member is to be coupled.

In some exemplary embodiments, the first plate member may comprise: a pair of terminal forming parts at which the terminal part and the connection terminal part are disposed; and a connecting part connecting the pair of terminal forming parts, wherein a width of the connecting part is narrower than a width of the pair of terminal forming parts.

In some exemplary embodiments, the holder member may comprise: a conductive member hole through which the first conductive member penetrates; and a conductive member groove formed on an outer circumferential surface of the holder member, wherein at least of the conductive member groove is provided in a shape corresponding to that of the first conductive member.

In still another general aspect, there is provided an optical apparatus comprising a main body, a display part displaying information by being arranged at one side of the main body, and a camera module photographing an image or a picture by being installed at the main body, wherein the camera module comprises: a PCB (Printed Circuit Board); a holder member having one side supported by the PCB; a cover member disposed at another side of the holder member; an optical module disposed between the holder member and the cover member, and performing at least one of auto focusing function and optical image stabilization function; a first plate member and a second plate member disposed between the holder member and the cover member, and electrically connected to the optical module; and a first conductive member and a second conductive member respectively connecting the first plate member and the second plate member to the PCB.

According to an exemplary embodiment of the present disclosure, any separate circuit board for applying electric power to the optical module is not required. Thereby, the height of the camera module may be lowered to the extent of a thickness of the circuit board.

In addition, the optical module and the PCB may be electrically connected by at least a pair of conductive members formed of conductive material. Thereby, the conductive member may inhibit the holder member from being deformed due to external impacts, etc.

In addition, exemplary embodiments of the present disclosure may be widely applicable to various optical modules, such as a liquid lens or an LC lens, performing auto focusing and/or optical image stabilization functions by modifying refractive indexes. Thereby, productivity of the camera module can be enhanced.

DETAILED DESCRIPTION

Hereinafter, referring to accompanying exemplary drawings, some exemplary embodiments according to the present disclosure will be described in detail. In assigning a reference numeral to each element in the drawings, the same reference numerals will be assigned to the same or similar element, even if the element is illustrated in a different drawing. In addition, when it is determined that a detailed description about known function or structure relating to the present disclosure may evade the main point of the present disclosure, such detailed description may be omitted.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element.

As used herein, the term "PCB" is an acronym for "Printed Circuit Board", and the term "FPCB" is an acronym for "Flexible Printed Circuit Board".

Hereinafter, a structure of an optical apparatus according to an exemplary embodiment of the present disclosure will be described.

An optical apparatus according to an exemplary embodiment of the present disclosure may be any one of a mobile phone, a smart phone, a portable smart device, a digital camera, a laptop computer, a digital broadcasting device, a PDA (Personal Digital Assistant), a PMP (Portable Multimedia Player), and a navigation device, but not limited hereto. Thus, any kind of device to photograph a picture or motion picture may be the optical apparatus.

The optical apparatus according to an exemplary embodiment of the present disclosure may comprise a main body (not illustrated), a display part (not illustrated) displaying information by being arranged at one side of the main body, and a camera module photographing an image or a picture by being installed at the main body.

Hereinafter, a structure of the camera module will be described with reference to the accompanying drawings.

Figure 1:
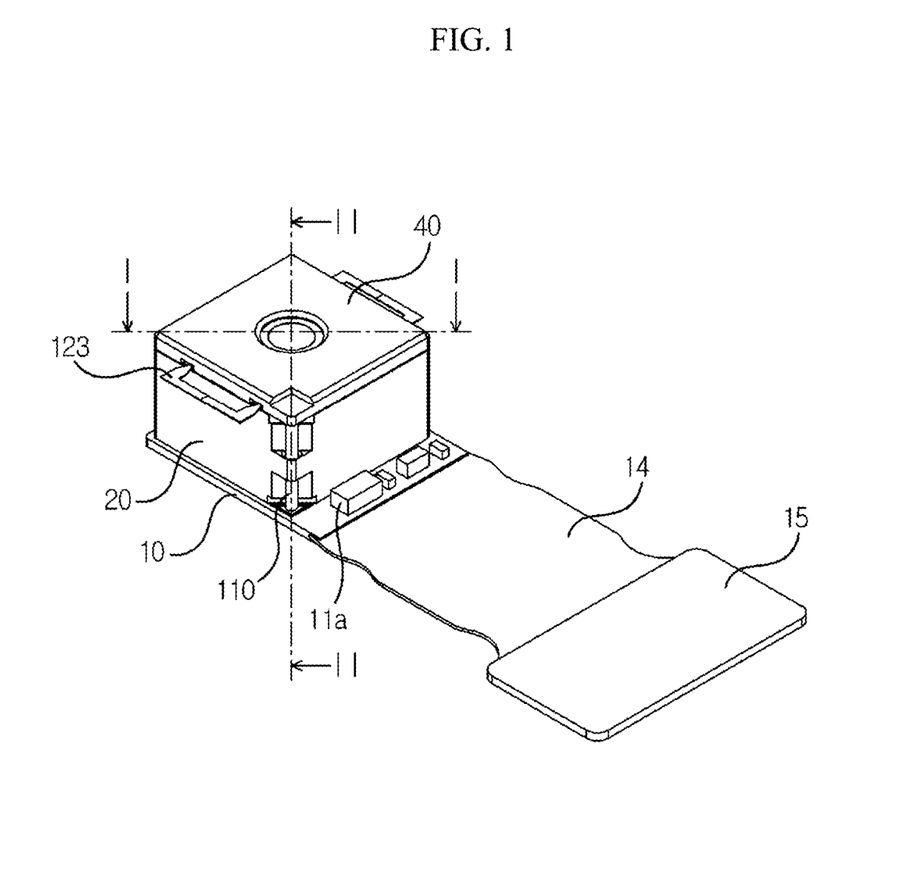
FIG. 1 is a perspective view illustrating a camera module, immediately after it is assembled, according to an exemplary embodiment of the present disclosure.
Figure 2:
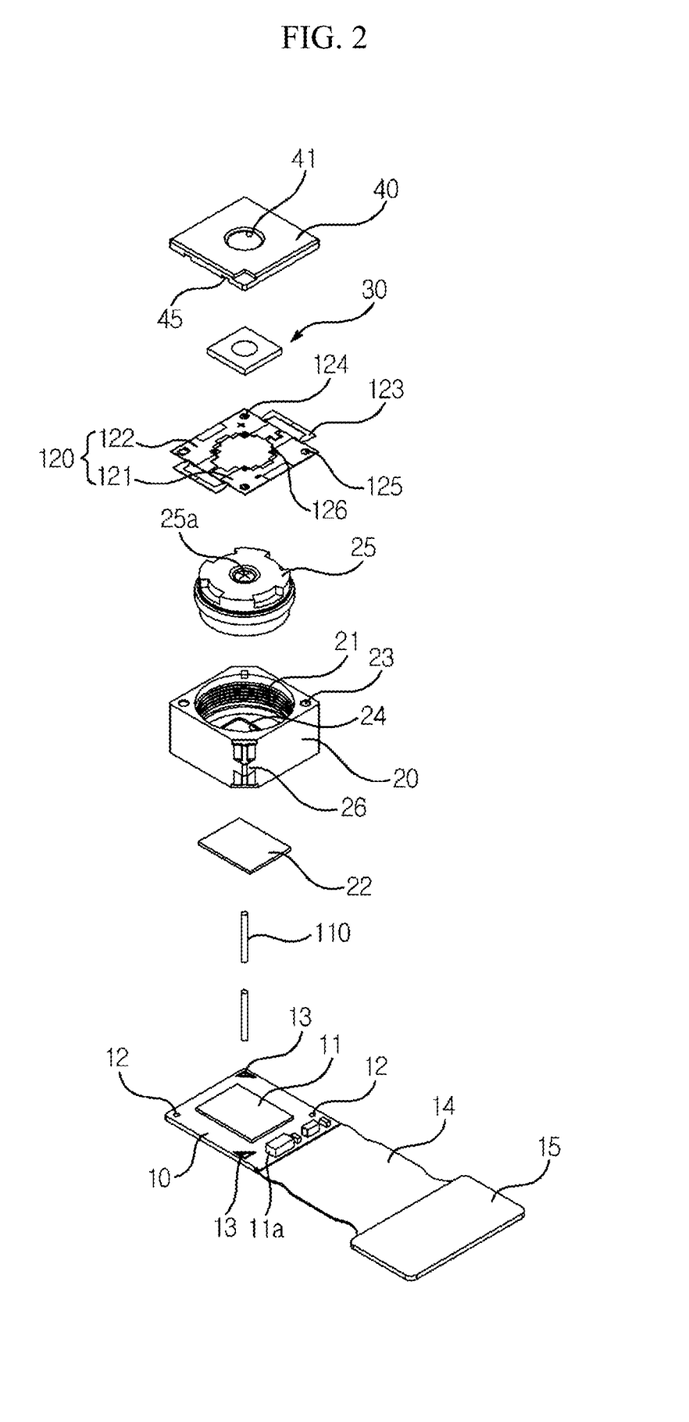
FIG. 2 is an exploded perspective view of FIG. 1.
Figure 3:
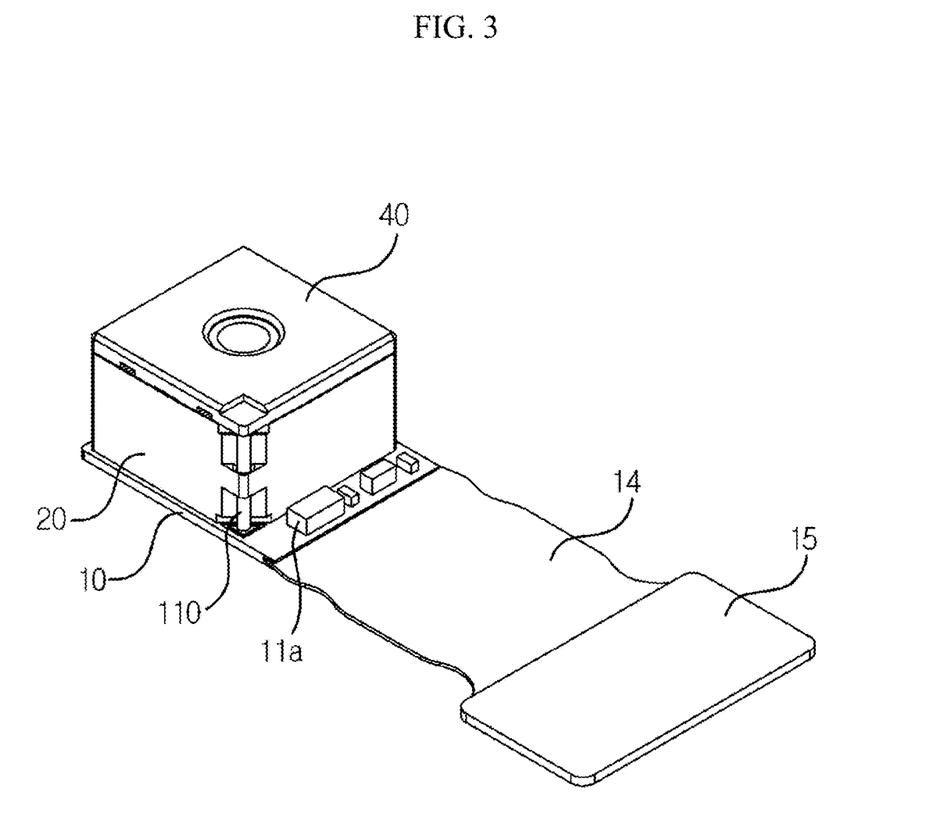
FIG. 3 is a view illustrating a state where a rib part is excluded from FIG. 1.
Figure 4:
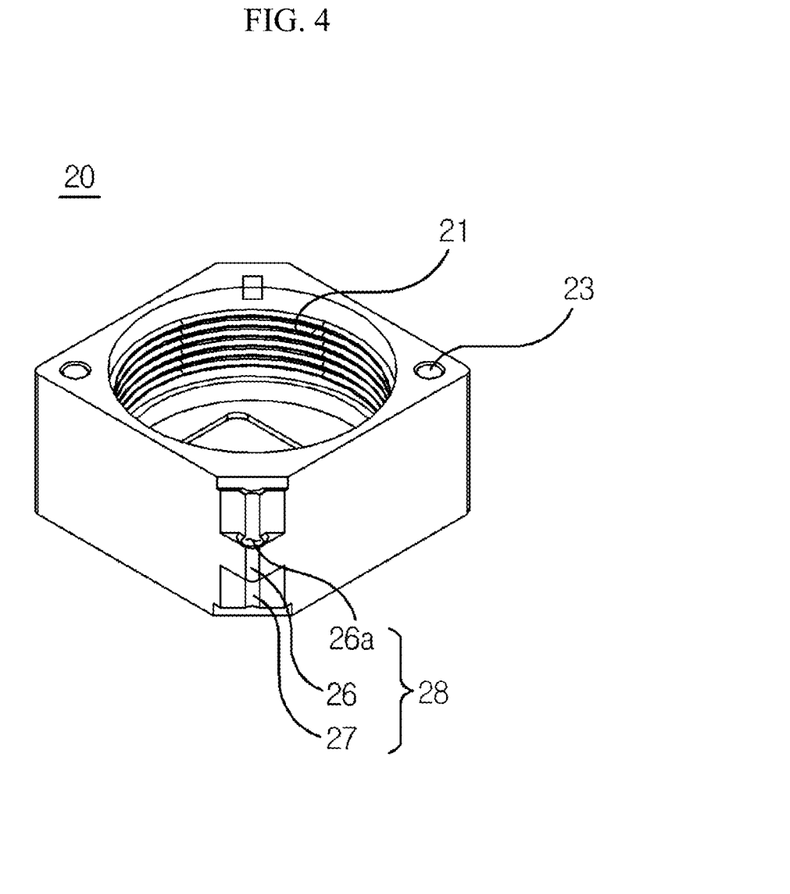
FIG. 4 is a perspective view illustrating a holder member according to an exemplary view of the present disclosure.
Figure 5:
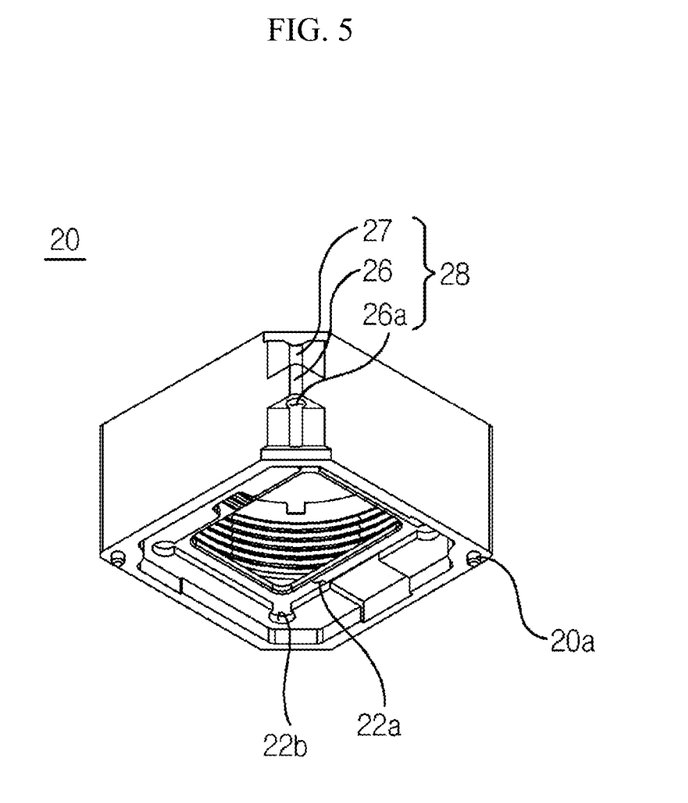
FIG. 5 is a bottom perspective view illustrating a holder member according to an exemplary view of the present disclosure.
Figure 6:
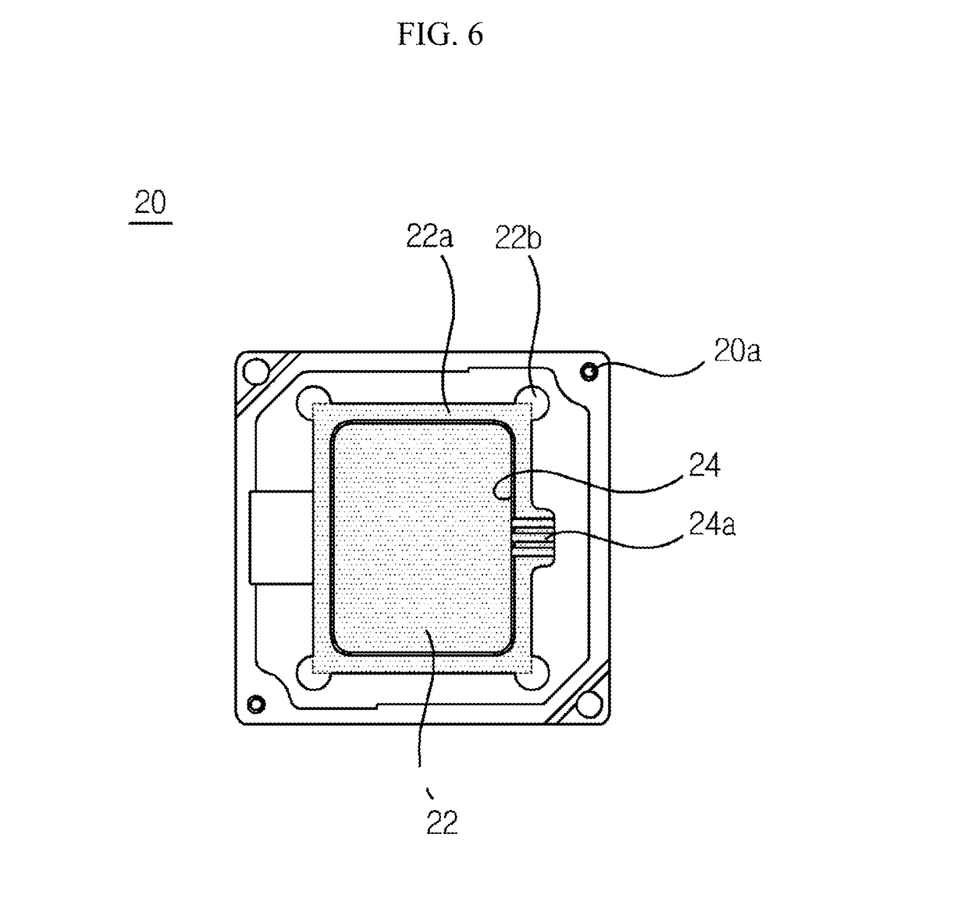
FIG. 6 is a bottom view illustrating a bottom surface of a holder member according to an exemplary embodiment of the present disclosure.
Figure 7:
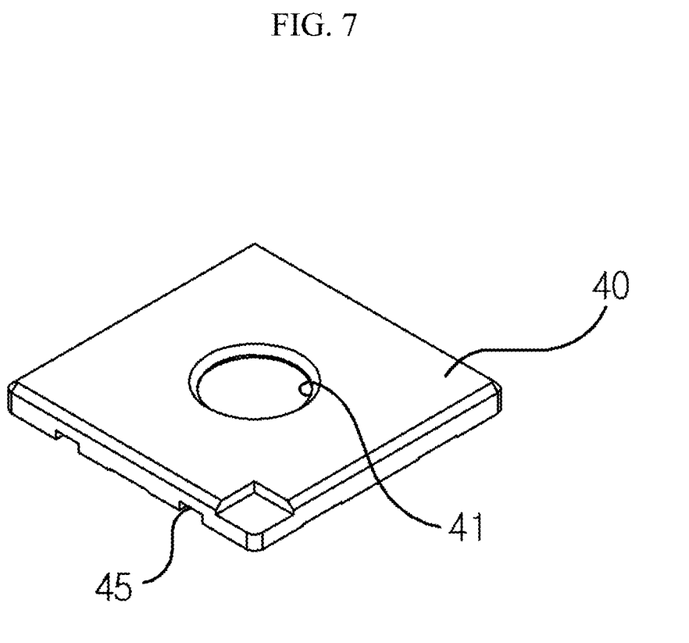
FIG. 7 is a perspective view illustrating a cover member according to an exemplary embodiment of the present disclosure.
Figure 8:
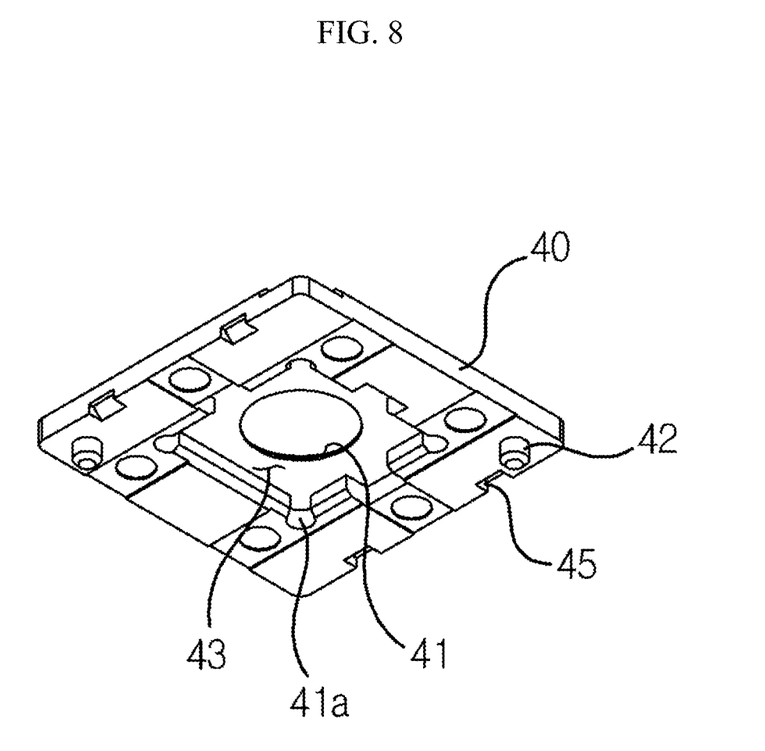
FIG. 8 is a bottom perspective view illustrating a bottom surface of a cover member according to an exemplary embodiment of the present disclosure.
Figure 9:
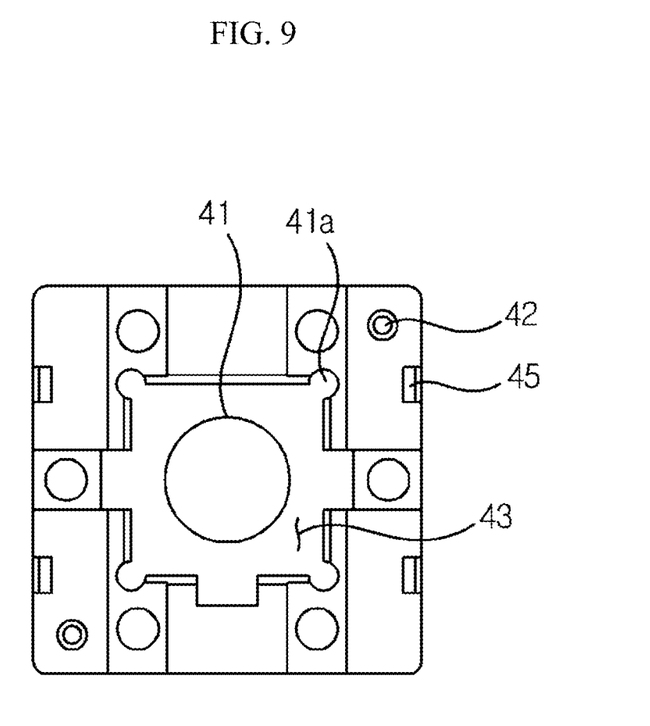
FIG. 9 is a bottom view illustrating a bottom surface of a cover member according to an exemplary embodiment of the present disclosure.
Figure 10:
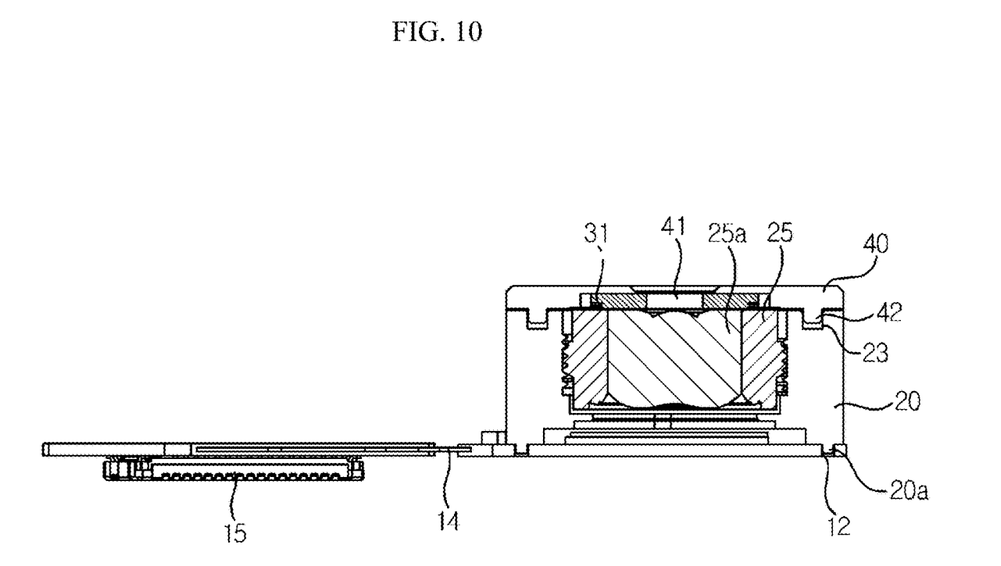
FIG. 10 is I-I sectional view of FIG. 1.
Figure 11:
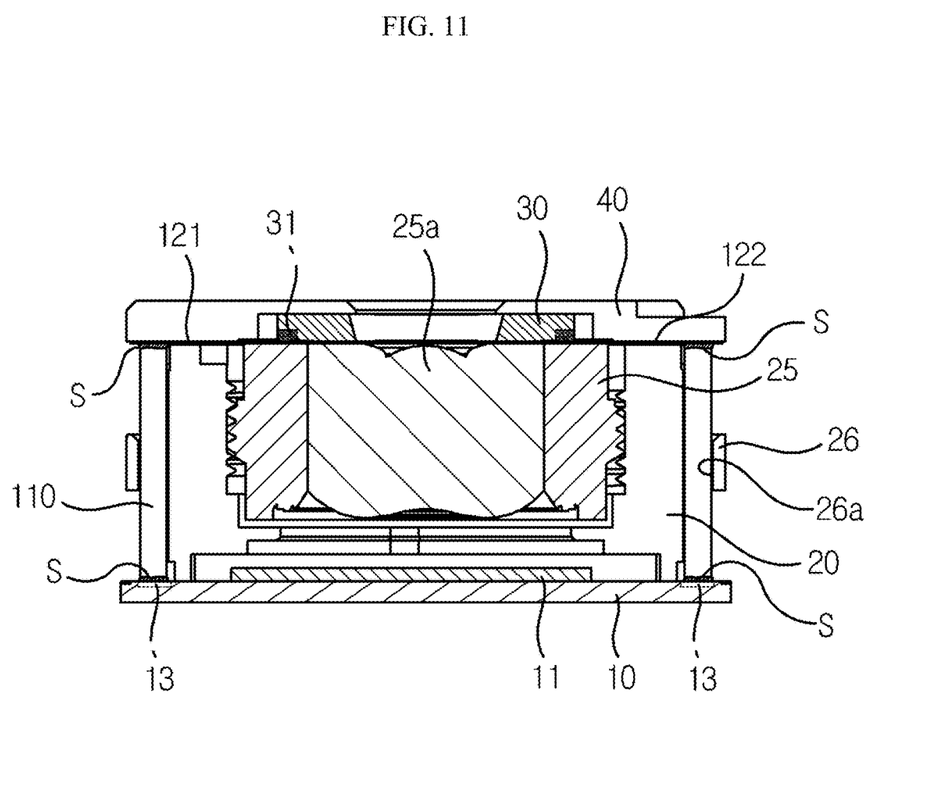
FIG. 11 is II-II sectional view of FIG. 1.
Figure 12:
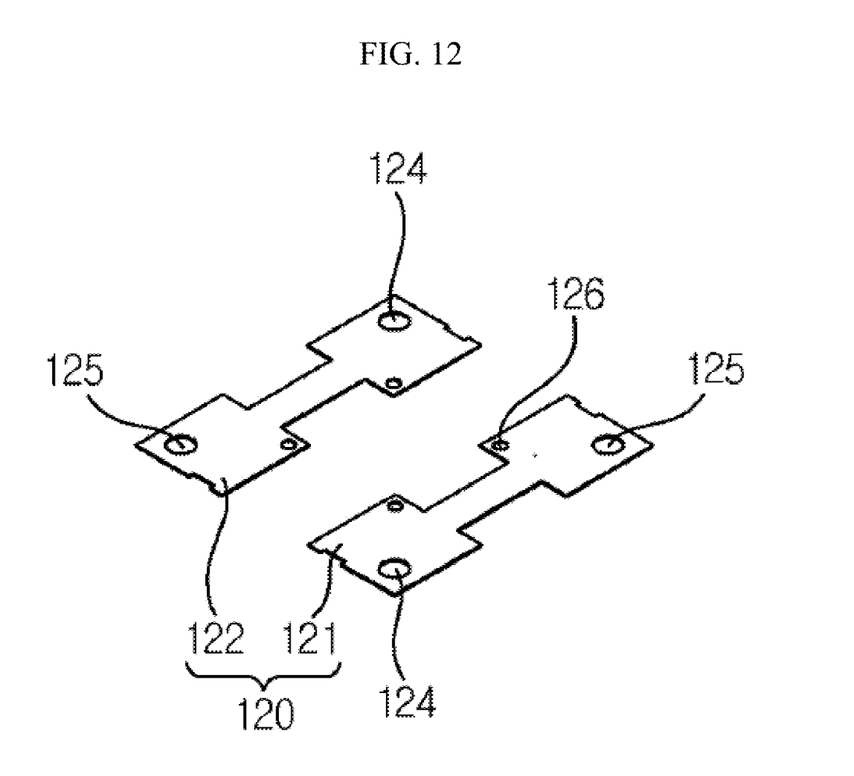
FIG. 12 is a perspective view according to another exemplary embodiment of the present disclosure.

FIG. 1 is a perspective view illustrating a camera module, immediately after it is assembled, according to an exemplary embodiment of the present disclosure; FIG. 2 is an exploded perspective view of FIG. 1; FIG. 3 is a view illustrating a state where a rib part is excluded from FIG. 1; FIG. 4 is a perspective view illustrating a holder member according to an exemplary view of the present disclosure; FIG. 5 is a bottom perspective view illustrating a holder member according to an exemplary view of the present disclosure; FIG. 6 is a bottom view illustrating a bottom surface of a holder member according to an exemplary embodiment of the present disclosure; FIG. 7 is a perspective view illustrating a cover member according to an exemplary embodiment of the present disclosure; FIG. 8 is a bottom perspective view illustrating a bottom surface of a cover member according to an exemplary embodiment of the present disclosure; FIG. 9 is a bottom view illustrating a bottom surface of a cover member according to an exemplary embodiment of the present disclosure; FIG. 10 is I-I sectional view of FIG. 1; FIG. 11 is II-II sectional view of FIG. 1; and FIG. 12 is a perspective view according to another exemplary embodiment of the present disclosure.

Referring to FIGS. 1 to 3, the camera module according to an exemplary embodiment may comprise a PCB (10), a holder member (20), and an optical module (30). In addition, the camera module according to an exemplary embodiment may further comprise a separate cover member (40).

An image sensor (11) may be installed on a center of the PCB (10). In addition, a plurality of passive and/or active elements (11a) may be mounted on the PCB (10). Meanwhile, at least one coupling hole (12) or groove may be formed on the PCB (10), where the holder member (20) may be coupled in the at least one coupling hole (12) or groove. A position of the one coupling hole (12) or groove may correspond to a position of a coupling protrusion (20a) formed on the holder member (20). In addition, as illustrated in the drawings, the coupling hole (12) or groove may be provided in a shape of a cylinder, but not limited hereto. Thus, the shape of the coupling hole (12) or groove may be modified in various ways, such as a trigonal prism or a square pillar, depending on the shape of the coupling protrusion (20a).

The PCB pad part (13) is a part where the conductive member (110) is to be fixed and/or coupled by such as soldering, conductive epoxy, and Ag epoxy. Meanwhile, the optical module (30) may be applied with electric power through the PCB pad part (13). The conductive member (110) may be a pin member, a plate member, a wire, a substrate, a PCB or an FPCB, but not limited hereto. Thus, any conductive shape or material may be adapted for the conductive member (110).

As illustrated in FIG. 2, the PCB pad part (13) may be provided in a number of at least two. Here, each of the PCB pad parts (13) may be respectively connected to a power source having different polarities or to different power sources. In addition, a current may be applied to the optical module (30) through the PCB pad part (13). In addition, the PCB pad part (13) may be provided in a triangular shape in order to reserve as large contacting area as possible. However, the present disclosure is not limited hereto. Thus, the PCB pad part (13) may be provided in various shapes such as a rectangle or a circle. According to an exemplary embodiment of the present disclosure, the conductive member (110) may be provided in a number of two. That is, the conductive member (110) may comprise a first conductive member and a second conductive member.

The connecting cable (14) may deliver an electric power and a control signal to the PCB (10). The connector part (15) may receive inputs of electric power and/or control signals by being coupled to a side of the electric device connected with the camera module.

According to an exemplary embodiment of the present disclosure, as illustrated in FIGS. 4 to 6, there may be formed a screw thread (21) on an inner circumferential surface of the holder member (20). A lens barrel (25) having at least one lens (25a) may be screw-coupled to the screw thread (21). However, the present disclosure is not limited hereto. The lens barrel (25) may be directly coupled to the holder member (20) using adhesive, without being screw-coupled. In addition, the lens barrel (25) may be injection-molded with the holder member (20).

A filter installation part (22a), in which an infrared cut-off filter (22) is to be installed, may be concavely formed on a bottom surface of the holder member (20). The filter installation part (22a) may be formed corresponding to or slightly larger than a size of the infrared cut-off filter (22). As illustrated in FIG. 6, circular or curved gap grooves (22b) may be formed at positions corresponding to four edge portions of the infrared cut-off filter (22).

When four edges of the infrared cut-off filter (22) is pointedly formed, and in the case that edge parts of the filter installation part (22a) is not as sharply formed as the edge of the infrared cut-off filter (22) within the range of tolerance, the infrared cut-off filter (22) may fail to be correctly installed or may be damaged.

The gap groove (22b) may be provided in order to such error during the assembly process. Once the gap groove (22b) is configured, the edge parts of the filter installation part (22a) may be circularly formed by the gap groove (22b), such that the four edges of the infrared cut-off filter (22) may be inhibited from being interfered at this portion. Thereby, the infrared cut-off filter (22) may be coupled to be fixed at the correct position.

Conductive member supporting parts (28) may be formed at least two positions among a plurality of edge pats and side parts of the holder member (20). Thereby, the conductive member (110) may be fixed, arranged, coupled, or inserted in the conductive member supporting parts (28).

The conductive member supporting part (28) may comprise an edge portion (26) formed with a conductive member hole (26a), and a conductive member groove (27). The conductive member supporting parts (28) may be provided in a pair. That is, the conductive member supporting part (28) may comprise a first conductive member supporting part and a second conductive member supporting part.

The edge part (26) may be formed on a body of the holder member (20). Meanwhile, as illustrated in FIG. 4, the edge part (26) may be formed on a center part in a vertical direction of an edge portion of the holder member (20). The reason of configuring the edge part (26) in this manner is in order to produce a mold for injecting the holder member (20) at lower cost.

However, upper and lower sides of the edge part (26) may not be in an incised shape, but only a conductive member hole (26a) may be formed, such that the conductive member (110) may be inserted in the conductive member hole (26a) to be integrally injection-molded. In addition, as illustrated in the drawings, when the conductive member hole (26a) is formed by removing upper and lower portions of the edge part (26), the conductive member hole (26a) can be implemented without need to insert a separate insert material.

The conductive member groove (27) may be connected to the conductive member hole (26a) formed at the edge part (26). The conductive member groove (27) may be concavely formed at the edge part being incised and exposed on upper and lower sides of the edge part (26). Here, the concave curvature of the conductive member groove (27) may be formed corresponding to a curvature of an outer circumferential surface of the conductive member (110). In this case, the conductive member groove (27) may support a lateral surface of the conductive member (110). Meanwhile, when the conductive member (110) is flat, the conductive member groove (27) may be flat or may not be provided. In addition, the conductive member (110) may maintain a correct position by the conductive member groove (27) and/or the conductive member hole (26a), during the assembly process.

Meanwhile, the conductive member supporting part (28) including the edge part (26) and the conductive member groove (27) may be arranged in correspondence to the arrangement position of the conductive member (110). For example, when the conductive member (110) is arranged parallel to a surface of the holder member (20), the conductive member supporting part (28) may also be arranged parallel to the surface of the holder member (20). In addition, when the conductive member (110) is arranged in a diagonal direction based on a center of the holder member (20), the conductive member supporting part (28) may also be arranged in a diagonal direction of the holder member (20).

Meanwhile, a coupling protrusion (20a) for coupling with the PCB (10) may be protrusively formed on a bottom surface of the holder member (20). Alternatively, any separate coupling protrusion may not be provided. The coupling protrusion (20a) may be arranged at an edge part of the holder member (20). In addition, the coupling protrusion (20a) may be arranged at a position where the conductive member supporting part (28) is not formed. That is, as illustrated in FIG. 5, the conductive member supporting parts (28) are arrange in positions diagonal to each other, the coupling protrusion (20a) may be formed at the rest of edge parts where the conductive member supporting part (28) is not formed.

The optical module (30) may be arranged at an upper side of the holder member (20). The optical module (30) may include at least one of auto focusing function and/or optical image stabilization function. As illustrated in FIG. 2, the optical module (30) may be roughly formed in a shape of a rectangle. According to an exemplary embodiment, as illustrated in FIG. 2, the optical module (30) may include at least two pad part (31). In addition, the optical module (30) may include four pad part. The pad part (31) may be electrically connected to first and second plate members (121) (122). The first and second plate members (121) (122) will be described hereinafter.

The optical module (30) may be provided as an actuator of single-lens moving type. In addition, the optical module (30) may be configured to perform auto focusing function and/or optical image stabilization function. For example, an actuator having a variable lens formed of liquid crystal lens, liquid lens, or piezoelectric polymer lens (piezo polymer lens) may be additionally configured to perform auto focusing function and/or optical image stabilization function, by modifying refractive index of the light, without physically moving the lens.

That is, the actuator may be any one of MEMS (Micro-ElectroMechanical Systems) actuator, a liquid crystal lens, a MEMS Piezo actuator, a MEMS bimorph actuator, a MEMS thermal actuator, a MEMS magnetic actuator, a MEMS liquid actuator, a non-MEMS actuator such as a piezoelectric polymer lens (piezo polymer lens), a silicon type actuator and a liquid lens. The actuator may be formed of a combination of those lenses.

The cover member (40) may be installed or arranged at an upper surface of the holder member (20) to protect the cover member (30) and/or the holder member (20). The cover member (40) may be provided in a shape corresponding to that of the upper surface of the holder member (20). For example, when the holder member (20) has an upper surface in a shape of a rectangle, the cover member (40) may be formed in a size corresponding to that of the upper surface of the holder member (20). That is, the bottom surface of the cover member (40) may be coupled to the upper surface of the holder member (20).

As illustrated in FIG. 7, a through-hole (41) may be formed in a center of the cover member (40). The light may pass through the through-hole (41), such that the light including an image may be delivered to the lens barrel (25).

As illustrated in FIG. 8, at least one coupling protrusion (42) may be formed protrusively toward the holder member (20). The coupling protrusion (42) may be formed in various shapes. According to an exemplary embodiment, the coupling protrusion (42) may be provided in a shape of a cylinder. Here, a tapered inclined surface may be formed at an end of the coupling protrusion (42), in order to enhance assembly convenience.

Meanwhile, as illustrated in the drawings, the coupling protrusion (42) based on the center of the cover member (40). Here, the position of the coupling protrusion (42) may be arranged to avoid overlapping with the position of the conductive member (110). That is, as illustrated in the drawings, when the arranged position of the conductive member (110) is in a diagonal direction based on the center of the holder member (20), the coupling protrusion (42) may be installed adjacent to another edge in order to avoid overlapping with the position of the conductive member (110). On the contrary, although it is not illustrated, when the conductive member (110) is arranged parallel to a surface of the holder member (20), the coupling protrusion (42) may be arranged on another surface where the conductive member (110) is not arranged. However, the present disclosure is not limited hereto. Therefore, any position where those elements are not overlapping with each other would be available.

A concave groove (43) may be formed on an interior of a bottom surface of the cover member (40). The concave groove (43) may be provided in a shape larger than or corresponding to the shape of the optical module (30). When the optical module (30) is in a rectangular shape as illustrated, the concave groove (43) may also be provided in a rectangular shape. In addition, when the optical module (30) is in a circular shape as illustrated, the concave groove (43) may also be provided in a circular shape. Here, as illustrated in FIG. 9, a circular-shaped gap groove (41a) may be formed at four edges of the concave groove (43). The gap groove (41a) may be formed such that the optical module (30) can accurately adhere due to the tolerance at edges when four edges of the concave groove (43) are arranged adhering to the corresponding edges of the optical module (30). The gap groove (41a) may be formed at an edge part of the concave groove (43). Meanwhile, the gap groove (41a) may inhibit the phenomenon where the optical module (30) cannot be installed at the regular position of the concave groove (43) due to the tolerance.

The conductive unit may include two conductive members (110) and plate members including first and second plate members (121) (122).

The conductive member (110) may be provided in a cylindrical shape such as a pin or a wire. In addition, the conductive member (110) may be formed as a conductive material such as metal. Meanwhile, upper and lower surfaces of the conductive member (110) may be formed flat.

Therefore, as illustrated in FIG. 11, a lower surface of the conductive member (110) may be fixed to the circuit board pad part (13) of the PCB (10), and an upper surface of the conductive member (110), using conductive adhesive (S). In addition, the conductive member (110) may be couple by passing through the conductive member hole (26a) formed at the corner part (26). Here, a side wall of the conductive member (110) may be supported by the conductive member groove (27) connected to the conductive member hole (26a). Alternatively, any separate conductive member groove may not be provided.

The plate member (120) may include first and second plate members (121) (122). The first plate member (121) may be spaced apart from the second plate member (122). In addition, the first plate member (121) and the second plate member (122) may be electrically connected to each other through the conductive member (110) and the optical module (30). In addition, the first and the second plate members (121)(122) may be electrically insulated to serve as a terminal.

As illustrated in FIGS. 2 and 12, the first plate member (121) and the second plate member (122) may be provided in the same shape. Alternatively, although it not illustrated, the first plate member (121) and the second plate member (122) may be provided in different shapes. Since the shapes of the first plate member (121) and the second plate member (122) are determined by design. Therefore, any shape that is conductive and arrangeable on the upper surface of the holder member (20) may be employed.

Meanwhile, as illustrated in FIG. 12, the first and second plate members (121)(122) may be formed as two separated members. Here, each of the first and second plate members (121)(122) may be coupled to the optical module (30) at first and then may be assembled. Alternatively, the first and second plate members (121)(122) may be coupled to the upper surface of the holder member (20) at first, and then the optical module (30) may be mounted thereon.

The first and second plate members (121)(122) may comprise a terminal part (124) connected to the conductive member (110), a connection terminal part (126) connected to the optical module (30), and a through-hole (125) in which a coupling protrusion (42) of the cover member (40) is to be coupled. In addition, the first and second plate members (121)(122) may comprise a pair of terminal forming parts (120a) at which the terminal part (124) and the connection terminal part (126) are disposed, and a connecting part (120b) connecting the pair of terminal forming parts (120a). Here, a width of the connecting part (120b) may be narrower than a width of the pair of terminal forming parts (120a).

Meanwhile, as illustrated in FIG. 2, the first and second plate members (121)(122) may be connected to each other using the rib part (123). The rib part (123) may be formed in order to inhibit separation of the first and second plate members (121)(122) from each other, when the first and second plate members (121)(122) are formed through the press process. The rib part (123) may allow the first and second plate members (121)(122) to be delivered during the assembly process while being stuck to each other. Afterwards, as illustrated in FIG. 3, the rib part (123) may be cut off after the assembly is completed. The cut position may be sealed with an epoxy resin.

The cover member (40) may comprise a rib groove part (45) formed on a position corresponding to that of the rib part (123). The rib part (123) may be exposed through the rib groove part (45). In addition, the first and second plate members (121)(122) may be respectively formed with a terminal part (124) and a through-hole (125).

The terminal part (124) may be arranged at a position corresponding to that of the conductive member (110), and may be supplied with electric power and current, by being connected with conductive members such as soldering, Ag epoxy, and conductive epoxy. That is, as illustrated in FIG. 11, the connection terminal part (126) may be provided at the position of the first and second plate members (121) (122) corresponding to the pad part (31) of the optical module (30), as illustrated in FIG. 2. Thereby, the optical module (30) may be supplied with electric power and current, through connection with the connection terminal part (126).

As illustrated in FIGS. 2, 10, and 12, the coupling protrusion (42) formed on the cover member (40) may pass through the through hole (125). The through hole (125) may be formed at the position corresponding to that of the protrusion accommodation groove (23). Here, the diameter of the through hole (125) may correspond to the that of the coupling protrusion (42).

As described in the above, when the optical module (30) is supplied with electric power and/or current by the plate member (120), the height of the camera module may be decreased in comparison with the case of using the conventional wiring device such as an FPCB. When the substrate such as the FPCB is used, the thickness thereof may be around 0.15 mm in general. However, when the plate member (120) is configured as described in the present exemplary embodiment, the thickness may be formed in the thickness under 0.03 mm at least. However, the thickness may be variously configured such as under 0.1 mm, under 0.07 mm, or under 0.05 mm, as occasion demands.

Meanwhile, the camera module according to an exemplary embodiment of the present disclosure may take non-focus adjustment type. The non-focus adjustment typed camera module may comprise a holder member (20), where the lens barrel (25) including at least one lens may be directly installed at an inner side of the holder member (20). However, the present disclosure is not limited hereto. Although it is not illustrated in the drawings, exemplary embodiments of the present disclosure may be applied to the conventional camera module taking focus adjustment type.

Meanwhile, a shield can (not illustrated) formed of metallic material may be separately configured at an external side of the holder member (20). In this case, an insulating member such as insulating epoxy may be additionally coated between the conductive member and the shield can. Thereby, the insulating member may inhibit short-circuit between the conductive member and the shield can. Alternatively, any separate insulating member may not be required in the structure where the conductive member (110) is physically spaced apart from the shield can. In this case, the plate member (120) may be so configured as not to be exposed or protruded towards outside.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A camera module, comprising:
   a PCB (Printed Circuit Board);
   an image sensor disposed on the PCB;
   a holder disposed on the PCB;
   a lens barrel disposed in the holder;
   a liquid lens disposed on the holder, and configured for performing at least one of an auto focusing function and an optical image stabilization function;
   a conductive unit electrically connecting the PCB and the liquid lens; and a cover member disposed on an upper surface of the holder;

wherein the conductive unit comprises:

a first conductive member and a second conductive member disposed opposite to the first conductive member, wherein the first and second conductive members are electrically connected to the PCB, and wherein the holder comprises a first conductive member supporting part and a second conductive member supporting part on a side surface of the holder, each of the first and second conductive member supporting parts including a groove recessedly formed on the side surface of the holder, wherein the first and second conductive members are disposed on the first and second conductive member supporting parts, respectively, wherein the liquid lens is disposed in an internal space of the cover member, and wherein the cover member comprises a concave groove formed with a shape corresponding to that of the liquid lens, the concave groove being formed on a bottom surface of the cover member facing the holder.

2. The camera module of claim 1, wherein each of the first and second conductive member supporting parts includes a hole, and wherein each of the first and second conductive members is disposed in a respective one of the holes.

3. The camera module of claim 1, wherein at an edge part of the concave groove, a circular-shaped gap groove is formed on a portion corresponding to an edge part of the liquid lens.

4. The camera module of claim 1, wherein at least a portion of the groove of the first or second conductive member supporting part is configured to have a shape to support a lateral surface of the first or second conductive member.

5. The camera module of claim 1, comprising a filter installation part, at which an infrared cut-off filter is to be installed, wherein the filter installation part is formed on a bottom surface of the holder.

6. The camera module of claim 5, wherein the infrared cut-off filter has a quadrilateral shaped cross section, and wherein the filter installation part comprises circular gap grooves formed on four edge parts of the filter installation part, respectively.

7. The camera module of claim 1, wherein the liquid lens comprises, on a bottom surface, a first pad part and a second pad part that are electrically connected to the first conductive member and the second conductive member, respectively.

8. The camera module of claim 7, wherein the first pad part and second pad parts are respectively disposed at positions corresponding to positions of at least two edge parts of the liquid lens.

9. A camera module, comprising:

a PCB (Printed Circuit Board);

a holder having one side supported by the PCB;

a cover member disposed at another side of the holder;

a liquid lens disposed between the holder and the cover member, and configured for performing at least one of an auto focusing function and an optical image stabilization function; and a first conductive member and a second conductive member disposed opposite to the first conductive member;

wherein the holder comprises a conductive member supporting part disposed on a side surface of the holder and having a hole, wherein the first conductive member is disposed in the hole, wherein the liquid lens is disposed in an internal space of the cover member, and wherein the cover member comprises a concave groove formed with a shape corresponding to that of the liquid lens, the concave groove being formed on a bottom surface of the cover member facing the holder.

10. The camera module of claim 9, wherein a refractive index of the liquid lens is adjusted based on supplied electric power.

11. An optical apparatus comprising a main body, a display part that displays information and is arranged at one side of the main body, and a camera module that captures an image and is installed at the main body, wherein the camera module comprises:

a PCB (Printed Circuit Board);

a holder having one side supported by the PCB;

a cover member disposed at another side of the holder;

a liquid lens disposed between the holder and the cover member, and configured for performing at least one of an auto focusing function and an optical image stabilization function; and a first conductive member and a second conductive member disposed opposite to the first conductive member;

wherein the holder comprises a conductive member supporting part disposed at a side surface of the holder, the conductive member supporting part having a conductive member groove recessedly formed on the side surface of the holder, wherein the conductive member is disposed on the conductive member groove, wherein the liquid lens is disposed in an internal space of the cover member, and wherein the cover member comprises a concave groove formed with a shape corresponding to that of the liquid lens, the concave groove being formed on a bottom surface of the cover member facing the holder.

12. The optical apparatus of claim 11, wherein each of the conductive member supporting parts includes a hole, and wherein each of the conductive members is disposed in a respective one of the holes.

13. The optical apparatus of claim 12, wherein a diameter of each hole corresponds to that of the respective conductive member.

* * * * *